(12) United States Patent
Matsuda

(10) Patent No.: US 8,021,255 B2
(45) Date of Patent: Sep. 20, 2011

(54) SILENT CHAIN POWER TRANSMISSION DEVICE

(75) Inventor: Akio Matsuda, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 669 days.

(21) Appl. No.: 12/095,373

(22) PCT Filed: Dec. 14, 2006

(86) PCT No.: PCT/JP2006/325666
§ 371 (c)(1),
(2), (4) Date: May 29, 2008

(87) PCT Pub. No.: WO2007/069793
PCT Pub. Date: Jun. 21, 2007

(65) Prior Publication Data
US 2009/0156342 A1  Jun. 18, 2009

(30) Foreign Application Priority Data
Dec. 14, 2005  (JP) .................... 2005-360266

(51) Int. Cl.
*F16H 7/06* (2006.01)
(52) U.S. Cl. ........................................ 474/155
(58) Field of Classification Search .......... 474/212, 474/213, 217, 216, 202, 206, 211, 84, 85, 474/155–157, 88, 210
See application file for complete search history.

(56) References Cited

U.S. PATENT DOCUMENTS
5,295,917 A * 3/1994 Hannum .................... 474/95
(Continued)

FOREIGN PATENT DOCUMENTS
| | | |
|---|---|---|
| DE | 19628463 | 1/1998 |
| EP | 0982516 | 3/2000 |
| JP | 8184348 | 7/1996 |
| JP | 2000065156 | 3/2000 |

OTHER PUBLICATIONS

International Search Report and Written Opinion dated Mar. 9, 2007 for PCT/JP2006/325666.

*Primary Examiner* — Emmanu M Marcelo
(74) *Attorney, Agent, or Firm* — Brown & Michaels, PC

(57) ABSTRACT

The present invention is directed to decreasing noise from the onset of engagement with the sprocket teeth till seating thereon and also to reducing wear to the silent chain and the sprocket. A face (a) of a sprocket tooth, which contacts the chain at the onset of engagement, has a tooth profile that is an envelope (1) of trajectories described by the inner flank surface (23) of the link plate (2) when the chain moves linearly toward the sprocket (S) and engages with the sprocket (S) without causing a chordal action. A crest (b) of the sprocket tooth, which contacts the chain (S) at the time of seating on the sprocket tooth, has a tooth profile that is an envelope (m) of trajectories described by the crotch (25) of the link plate (2) when the link plate (2) rotates around the connecting pin during the wrapping motion of the chain around the sprocket (S). A connecting surface (c) that connects the face (a) of the sprocket tooth with the crest (b) is formed of a curved surface which is inscribed in the envelope (1) of the trajectories during the linear motion of the link plate and the envelope (m) of the trajectories during the rotational motion of the link plate.

5 Claims, 7 Drawing Sheets

U.S. PATENT DOCUMENTS

| | | | |
|---|---|---|---|
| 5,419,743 A | 5/1995 | Takeda et al. | |
| 6,155,945 A * | 12/2000 | Matsuda | 474/212 |
| 6,244,983 B1 | 6/2001 | Matsida | |
| 6,494,800 B1 * | 12/2002 | Kanehira et al. | 474/215 |
| 2003/0186766 A1 * | 10/2003 | Wang et al. | 474/152 |
| 2005/0077096 A1 * | 4/2005 | Kokatsu et al. | 180/205 |

* cited by examiner

SILENT CHAIN POWER TRANSMISSION DEVICE

TECHNICAL FIELD

The present invention relates to a silent chain transmission device comprising a silent chain and a sprocket used together with the silent chain, which is formed of a plurality of link plates that are pivotably interconnected to each other via connecting pins, each of the link plates having a pair of teeth each formed of an inside flank surface and an outside flank surface.

BACKGROUND ART

Silent chains are used as timing chains or chains for auxiliary drives in automobiles, motorcycles and the like. A silent chain is generally formed of a plurality of link plates each having a pair of teeth and pin apertures and pivotably connected to each other via connecting pins inserted into the pin apertures. Also, each of the teeth of the link plates is formed of an inside flank surface and an outside flank surface.

At the time of power transmission through the silent chain, one of the flank surfaces of the teeth of the link plates engages with the teeth of the sprocket, thereby transmitting power from the drive sprocket to the driven sprocket.

In such a silent chain, noise results from a pitch noise generated at the time of engagement of the chain with the sprocket. In order to decrease the pitch noise, a smooth contact of the chain with the sprocket is most desirable without causing a collision between the chain and the sprocket.

Noise also results from chordal action of a chain span generated at the time of engagement of the chain with the sprocket. In order to decrease such chordal action, the chain needs to engage with the sprocket as the chain travels along a straight line.

In summary, when a chain having traveled along the straight line toward the sprocket slides into and engages with the sprocket without colliding with the sprocket and without causing chordal action, a further decrease in noise of the chain is possible.

In another point of view, such movement of the chain and sprocket may be the same motion as a tooth profile formation by a rack cutter. That is, it is possible to replace the linear portion of the chain with a rack cutter and also to replace the sprocket with a gear that is cut by the rack cutter.

From this point of view, the applicant of the present invention proposed a silent chain power transmission device as shown in Japanese patent application laying-open publication No. 8-184838 (JP 8-184838). In such a power transmission device, the protruded flank surface of the teeth on the sprocket engagement side in each of the link rows with the silent chain pulled straight has a shape similar to a portion of the tooth shape of a rack cutter that can cut a sprocket used together with the silent chain. Also, the sprocket tooth surface has a shape that has been cut by the rack cutter.

In this case, a chain having traveled along a straight line toward the sprocket slides into and engages with the sprocket without colliding with the sprocket and without causing chordal action, thus achieving a smooth contact of the link plate with the sprocket.

Thereby, not only occurrence of the pitch noise due to collision of the link plate with the sprocket but also occurrence of the noise due to a chordal action of the chain can be prevented, thus allowing for a further reduction of noise including low frequency noise. Moreover, in this case, since the amount of movement of each of the link rows in a chain span is proportional to the rotational angle of the sprocket, fluctuation of angular velocity can be prevented from occurring.

On the other hand, as a result of long years of diligent study on the noise that occurs during operation of the silent chain power transmission device, it has become clear that noise occurs not only at the onset of engagement of the chain with the sprocket but also at the time of seating (or the end of the engagement) of the chain onto the sprocket after progress of engagement.

Such noise at seating has a high peak value especially in the case of a chain with the engagement mode in which the inside flank surface engages with the sprocket tooth at the onset of engagement and the outside flank surface engages with the sprocket tooth at seating on the sprocket. That is because when the engagement point travels from the inside flank surface to the outside flank surface the load acting on the engagement point abruptly increases.

However, the silent chain described in JP 8-184838 is directed to decreasing noise only at the onset of engagement with the sprocket, and as a result of this, it cannot completely solve the noise issue during operation of the chain including seating.

The applicant of the present invention also proposed the silent chain power transmission device as shown in Japanese patent application laying-open publication No. 2000-65156 (JP 2000-65156). In this silent chain power transmission device, a portion of the sprocket tooth contacting the silent chain at the time of seating on the sprocket tooth has a tooth profile that is an envelope of trajectories described by the inside flank surface of the link plate when the link plate rotates around the connecting pin during the wrapping motion of the silent chain around the sprocket.

When the chain wraps around the sprocket the link plate rotates around the sprocket tooth and the inside flank surface of the link plate seats on the sprocket tooth. In this case, the engagement point of the link plate with the sprocket is located on the inside flank surface at all times from the onset of engagement till the seating. That is, an abrupt variation of the load due to transfer of the engagement point will not occur such as in the case of the chain in which the inside flank surface starts to engage with the sprocket tooth and the outside flank surface finishes engaging with the sprocket tooth to seat on the sprocket. As a result, noise lowers, the load on one sprocket tooth decreases, and the life span of the sprocket improves.

Also, in this case, since the tooth profile of the sprocket tooth is in the shape that is an envelope of trajectories described by the inside flank surface of the link plate during a rotational movement of the link plate, when the chain wraps around the sprocket the inside flank surface of the link plate that rotates around the sprocket tooth slides into and engages with the sprocket tooth without interfering with the sprocket tooth. Thereby, at the time of seating on the sprocket, the occurrence of the pitch noise due to collision of the link plate with the sprocket can be prevented and noise decreases.

In such a way, from the onset of engagement to the seating, noise can be further decreased, and thus noise and oscillation property advances.

On the other hand, in such a silent chain power transmission device, there exists a strong demand to decrease wear to the chain and sprocket. The applicant of the present invention has studied and examined the contact state between the chain and the sprocket during operation.

FIG. 7 illustrates the engaging state of a silent chain with a sprocket. The silent chain has an engagement mode in which the inside flank surface starts to engage with the sprocket tooth and the outside flank surface seats on the sprocket tooth.

Link plates 2' that constitutes a silent chain 1' has a pair of pin apertures 21' and teeth 22'. Connecting pins 3' are inserted into the pin apertures 21' to pivotably interconnect the adjacent link plates 2'. Each of the teeth 22' is formed of an inside flank 23' and an outside flank 24'.

As shown in FIG. 7, a link row $L_1'$ is located at the front row of a linear span of the silent chain 1' that moves linearly toward a sprocket S'. The inside flank surface 23' of the link row $L_1'$ is in the state of onset of engagement with a sprocket tooth t'. A link row $L_2'$ is in the state of engagement by a linear motion of the silent chain 1'. A link row $L_3'$ is in the state of engagement by a rotational motion of the link plate 2' when the silent chain 1' wraps around the sprocket S'. A link row $L_4'$ is in the state of seating on the sprocket tooth t' when the engagement has come to an end.

In FIG. 7, a reference mark T' designates a chain tension, and a reference mark F' designates a reaction force that the inside flank surface 23' of the link plate 2' receives from the sprocket tooth t' in the state of engagement. Resultant force of a plurality of the reaction forces F' combined in the direction along the chain tension is balanced by the chain tension T'. As can be clearly seen from FIG. 7, the reaction force F' that the inside flank surface 23' of the link plate 2' receives from the sprocket tooth t' becomes greatest at the positions of the link rows $L_2'$ and $L_3'$. That is, the reaction force F' has the maximum value when the silent chain finishes the linear motion to shift to the rotational motion.

On the other hand, with regard to the state of wear to the inside flank surface of the silent chain and the sprocket tooth after a lapse of a certain amount of operating hours, it has been found that an encircled portion A' in FIG. 7 was worn most badly. The encircled portion A' corresponds to the position where the inside flank surface 23' of the link plate 2' receives the maximum reaction force F' from the sprocket tooth t'.

Based upon the above-mentioned study and consideration, the applicant of the present invention has concluded that if the link plate of the silent chain does not contact the sprocket tooth at the position where the maximum reaction force occurs at the time of engagement of the silent chain with the sprocket then wear to at least the said position can be prevented.

The present invention has been made in view of the above-mentioned study and consideration, and its object is to provide a silent chain transmission device that can not only decrease noise from the onset of engagement till the seating on the sprocket but also reduce wear.

DISCLOSURE OF INVENTION

A silent chain transmission device according to a first aspect of the present invention comprises a silent chain and a sprocket used together with the silent chain. The silent chain is formed of a plurality of link plates that are pivotably interconnected to each other via connecting pins. Each of the link plates has a pair of teeth each formed of an inside flank surface and an outside flank surface. A face of a sprocket tooth has a tooth profile that is an envelope of trajectories described by the inner flank surface of the link plate when the silent chain moves linearly toward the sprocket to engage with the sprocket without causing a chordal action at an early stage of the engagement of the sprocket with the silent chain. A crest of the sprocket tooth has a tooth profile that is an envelope of trajectories described by the crotch of the link plate when the link plate rotates around the connecting pin during the wrapping motion of the silent chain around the sprocket at the time of seating of the link plate onto the sprocket. A connecting surface that connects the face of the sprocket tooth with the crest is formed of a curved surface which is inscribed in both the envelope of the trajectories during the linear motion of the link plate and the envelope of the trajectories during the rotational motion of the link plate.

According to the first aspect of the present invention, since the sprocket tooth face has a tooth profile that is an envelope of trajectories described by the inner flank surface of the link plate when the silent chain moves linearly toward the sprocket to engage with the sprocket without causing a chordal action at an early stage of the engagement of the sprocket with the silent chain.

Therefore, in this case, the silent chain that has traveled along the straight line toward the sprocket slides into and engages with the sprocket without colliding with the sprocket and causing a chordal action. A smooth contact of the link plate with the sprocket can be achieved. Thereby, at the onset of the engagement, a pitch frequency due to collision of the link plate with the sprocket tooth can be prevented from occurring and noise can thus be reduced.

Then, as the engagement proceeds and the silent chain wraps around the sprocket, the link plate rotates around the sprocket tooth and the crotch of the link plate seats on the sprocket tooth crest. That is, in this case, the engagement point of the link plate with the sprocket tooth is located at a region extending from the inside flank surface to the crotch from the onset of engagement till the seating. Thereby, an abrupt change of load due to a transfer of the engagement point can be eliminated such as in the case of the chain having an engagement mode in which the inside flank surface starts to engage with the sprocket tooth and the outside flank surface seats on the sprocket tooth. As a result, noise can be lowered, the load on one sprocket tooth can be decreased, and thus the life span of the sprocket can improve.

Also, in this case, a tooth profile of the sprocket tooth crest has a shape that is an envelope of trajectories described by the crotch of the link plate during the rotational motion of the silent chain.

When the silent chain wraps around the sprocket, the crotch of the link plate that rotates around the sprocket tooth slides into and engages with the sprocket tooth crest without interfering with the sprocket tooth. Thereby, at the seating, the occurrence of the pitch noise due to a collision of the link plate with the sprocket tooth can be prevented and thus noise can be reduced.

In such a manner, from the onset of engagement to the seating, noise can be decreased and noise and oscillation properties can be improved.

Moreover, in this case, the sprocket tooth face is connected to the sprocket tooth crest by a curved surface that is inscribed both in the envelope of the trajectories during the linear motion of the link plate and in the envelope of the trajectories during the rotational motion of the link plate. As a result of this, when the engagement point of the link plate travels from the sprocket tooth face to the sprocket tooth crest, that is, when the silent chain shifts from the linear motion to the rotational motion, the link plate can be prevented from contacting the sprocket tooth. Thereby, at the boundary portion between the sprocket tooth face and the sprocket tooth crest, the maximum surface pressure will not occur. As a result, wear to the silent chain and the sprocket can be decreased.

In another aspect of the present invention, unlike the first aspect of the present invention, the sprocket tooth face and the sprocket tooth crest are connected to each other via a flat surface.

In this case, when the engagement point of the link plate travels from the sprocket tooth face to the sprocket tooth crest, that is, when the silent chain shifts from the linear motion to the rotational motion, the link plate can be securely prevented from contacting the sprocket tooth. Thereby, at the boundary portion between the sprocket tooth face and the sprocket tooth crest, the maximum surface pressure will not occur. As a result, wear to the silent chain and the sprocket can be securely decreased.

In a still another aspect of the present invention, unlike the first aspect of the present invention, the sprocket tooth face and the sprocket tooth crest are connected to each other via a first curved surface whose radius of curvature is greater than a radius of curvature of a second curved surface that is inscribed in the sprocket tooth face and the sprocket tooth crest.

In this case, when the engagement point of the link plate travels from the sprocket tooth face to the sprocket tooth crest, that is, when the silent chain shifts from the linear motion to the rotational motion, the link plate can be securely prevented from contacting the sprocket tooth. Thereby, at the boundary portion between the sprocket tooth face and the sprocket tooth crest, the maximum surface pressure will not occur. As a result, wear to the silent chain and the sprocket can be securely decreased.

In a further aspect of the present invention, unlike the first aspect of the present invention, the sprocket tooth face and the sprocket tooth crest are connected to each other via a concavely curved surface.

In this case, when the engagement point of the link plate travels from the sprocket tooth face to the sprocket tooth crest, that is, when the silent chain shifts from the linear motion to the rotational motion, the link plate can be more securely prevented from contacting the sprocket tooth. Thereby, at the boundary portion between the sprocket tooth face and the sprocket tooth crest, the maximum surface pressure will not occur. As a result, wear to the silent chain and the sprocket can be more securely decreased. Furthermore, in this case, the concavely curved surface formed between the sprocket tooth face and the sprocket tooth crest can hold oil, thereby reducing wear to the link plate and the sprocket tooth.

In a still further aspect of the present invention, the connecting surface of the sprocket tooth is formed such that it is not in contact with the link plate of the silent chain at the time of engagement with the silent chain.

BEST MODE FOR CARRYING OUT THE INVENTION

Figure 1:
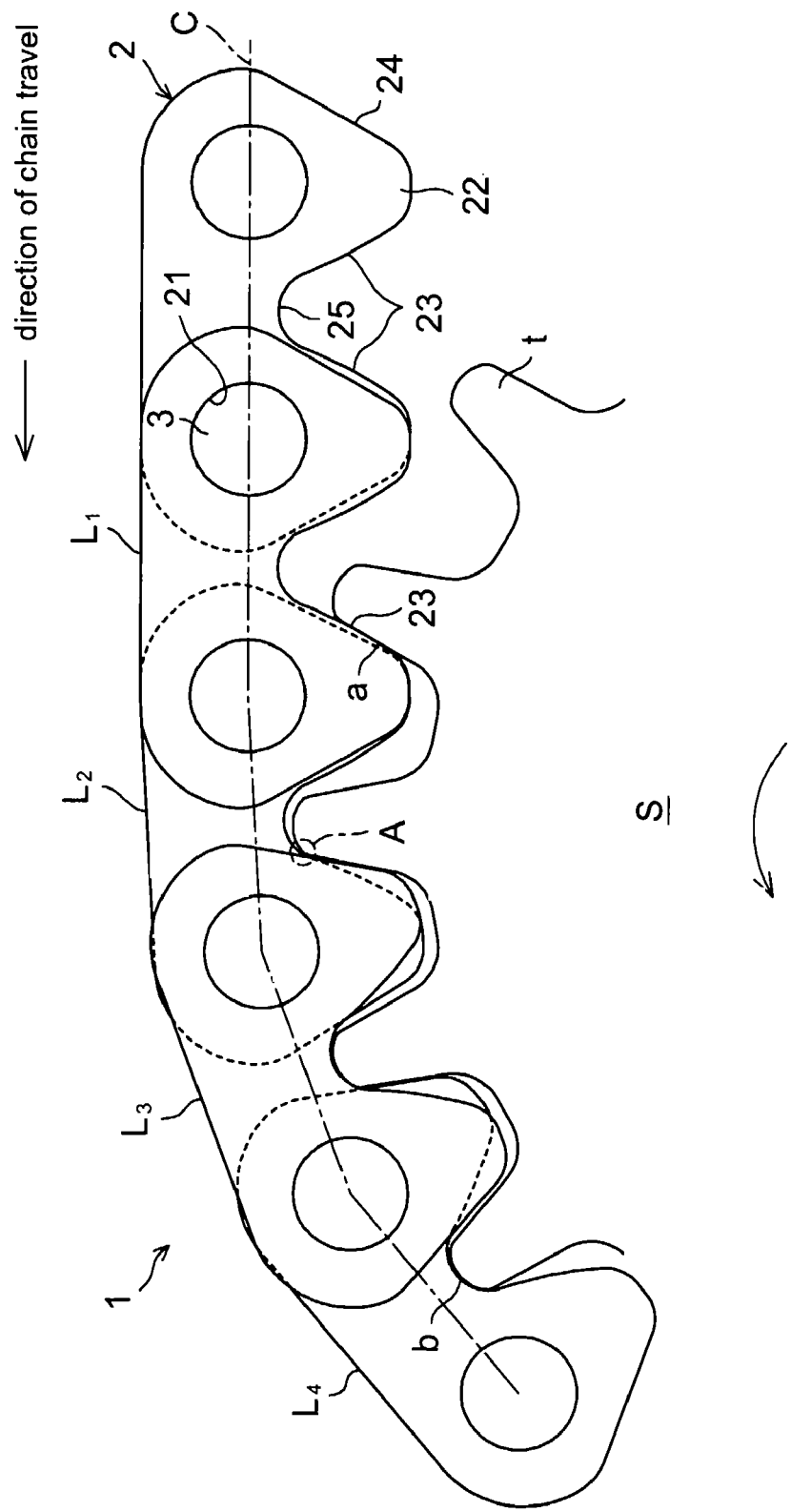
FIG. 1 is a side view of a portion of a silent chain power transmission device according to an embodiment of the present invention.

As shown in FIG. 1, a silent chain 1 is comprised of a plurality of link rows $L_1$, $L_2$, $L_3$, $L_4$, . . . that are pivotably connected to each other by connecting pins 3 inserted into pin apertures 21. Each of the ink rows is formed of a plurality of link plates 2 that are interlaced adjacent to each other. The link plate 2 has a pair of teeth 22 formed on one side of the center C of the pin apertures 21. Each of the teeth is formed of an inside flank surface 23 and the outside flank surface 24. Between the adjacent teeth 22, a crotch 25 is formed to couple the adjacent inside flank surfaces 23.

The link row $L_1$ is located at the front row of a linear span of the silent chain 1 that moves linearly toward a sprocket S. The inside flank surface 23 of the link row $L_1$ is in the state of onset of engagement with a sprocket tooth t. The link row $L_2$ is in the state of engagement by a linear motion of the silent chain 1. The link row $L_3$ is in the state of engagement by a rotational motion of the link plate 2 when the silent chain 1 wraps around the sprocket S. The link row $L_4$ is in the state of seating on the sprocket tooth t when the engagement has come to an end.

As can be clearly seen from FIG. 1, when the silent chain 1 is pulled straight, the inside flank surface 23 of the link plate 2 of each of the link rows is in contact with a face of a sprocket tooth t. When the silent chain 1 is in the state of wrapping around the sprocket S, the entire surface of the crotch 24 of the link plate 2 of each of the link rows is in contact with a crest of the sprocket tooth t.

Figure 2:
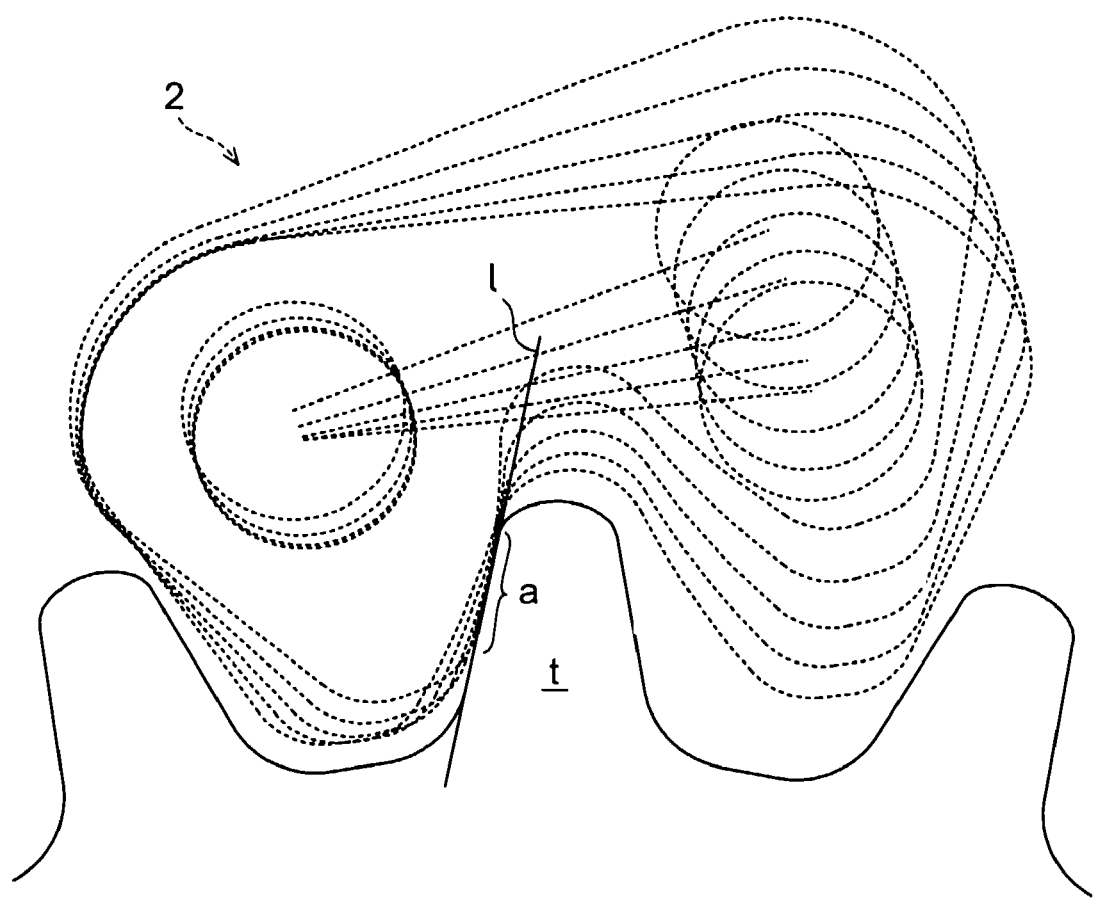
FIG. 2 illustrates a sprocket tooth profile curve, which is formed by trajectories described by the inner flank surface of the link plate when the silent chain moves linearly toward the sprocket.

Next, FIG. 2 illustrates trajectories described by the link plate 2 when the silent chain 1 moves linearly toward the sprocket S to engage with the sprocket tooth t without causing a chordal action. FIG. 2 shows trajectories of relative motion of the link plates 2 with the sprocket standstill. In the drawing, a reference mark l indicates an envelope of trajectories described by the inner flank surface 23 of the link plate 2. A reference mark a indicates a sprocket tooth face formed by the envelope l. In other words, the reference mark a indicates a sprocket tooth profile formed by the linear motion of the silent chain 1.

Figure 3:
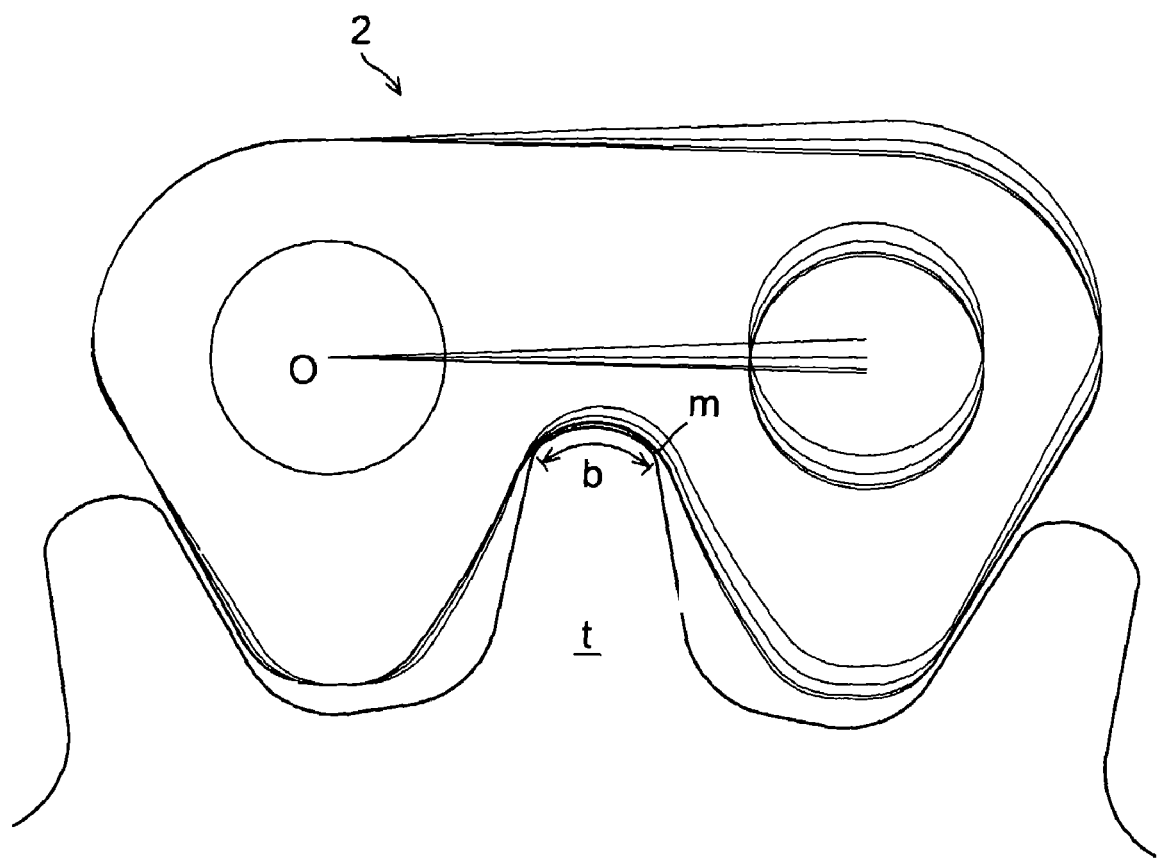
FIG. 3 illustrates a sprocket tooth profile curve, which is formed by trajectories described by the crotch of the link plate when the link plates articulates and the silent chain wraps around the sprocket.

Also, FIG. 3 illustrates trajectories described by the rotational motion of the link plate 2 when the silent chain 1 wraps around the sprocket S. FIG. 3 shows trajectories of relative motion of the link plates 2 with the sprocket standstill, in which the link plate 2 is rotated around the center O of one of the pin apertures. In the drawing, a reference mark m indicates an envelope of trajectories described by the crotch 25 of the link plate 2. A reference mark b indicates a sprocket tooth crest formed by the envelope m. In other words, the reference mark b indicates a sprocket tooth profile formed by the rotational motion of the silent chain 1.

Figure 4:
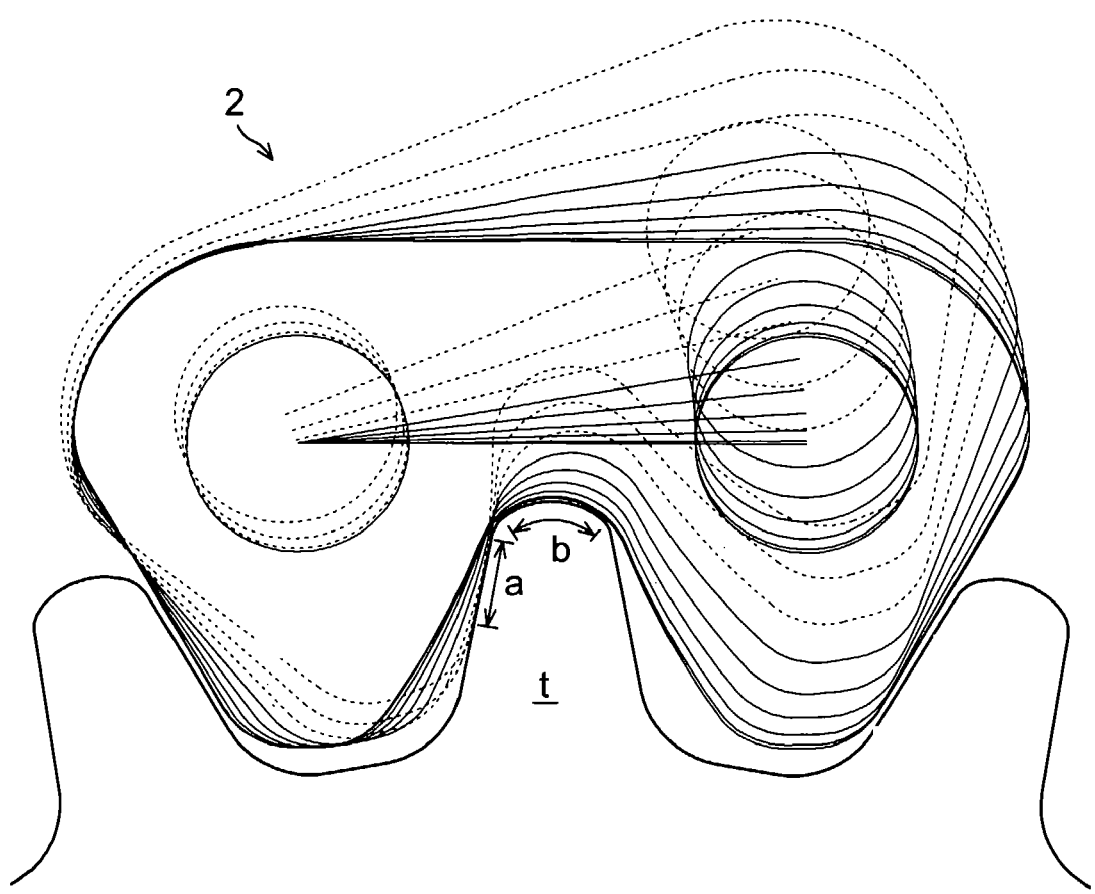
FIG. 4 illustrates a sprocket tooth profile curve, which is formed by combining the tooth profile curve of FIG. 2 with the tooth profile curve of FIG. 3.

FIG. 4 shows the combined state of FIGS. 2 and 3. In FIG. 4, the sprocket tooth profile of the sprocket tooth face, which is formed by the envelopes of the trajectories of the inside flank surface 23 of the link plate 2 during linear motion of the silent chain 1, is designated by a. The sprocket tooth profile of the sprocket tooth crest, which is formed by the envelopes of the trajectories of the crotch 25 of the link plate 2 during rotational motion of the silent chain 1, is designated by b.

Figure 5:
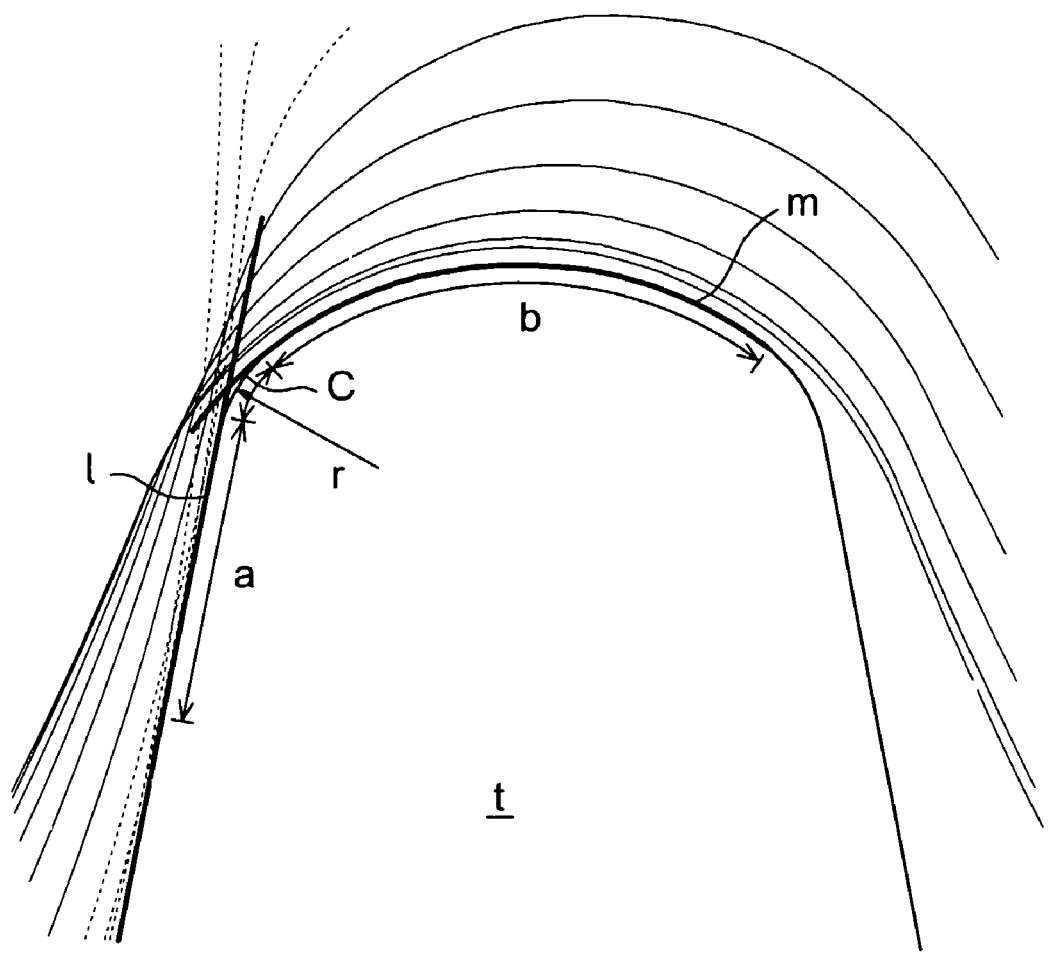
FIG. 5 is an enlarged view of FIG. 4.

FIG. 5 is an enlarged view of FIG. 4. In FIG. 5, a reference mark c indicates a connecting surface to smoothly couple the sprocket tooth face a to the sprocket tooth crest b. Here, the connecting surface c is a curved surface with a radius of curvature r that is inscribed in the envelopes l and m. In addition, as shown in FIG. 5, the envelopes l and m intersect each other outside the connecting surface c.

As shown in FIG. 1, as the silent chain 1 moves linearly toward the sprocket S, the inside flank surface 23 of the link plate 2 of the link row $L_1$ at the front row of the linear span comes into contact with the face a of the sprocket tooth t.

From this state, when the engagement by the linear motion of the silent chain proceeds, the engagement point of the inside flank surface 23 of the link plate 2 on the sprocket tooth is transferred to the crest side along the sprocket tooth face a.

At this juncture, as above-mentioned, the sprocket tooth face a has a tooth profile that is an envelope of trajectories described by the inner flank surface 23 of the link plate 2 during linear motion of the silent chain that engages with the sprocket S without causing a chordal action. Therefore, during transfer of the engagement point, the link plate 2 of the silent chain 1 slides into the sprocket tooth t and comes into smooth contact with the sprocket tooth t without colliding with the sprocket tooth t and causing a chordal action. As a result, at the onset of the engagement, the occurrence of the pitch noise due to a collision of the link plate 2 with the sprocket tooth t can be prevented and noise can be reduced.

Then, when the engagement further proceeds and the silent chain 1 wraps around the sprocket S, the link plate 2 rotates around the center O of one of the pin apertures 21 (on the leading side) and the crotch 25 of the link plate 2 seats on the crest b of the sprocket tooth t and comes into surface contact with the crest b.

At this juncture, as above-mentioned, the sprocket tooth crest b has a tooth profile that is an envelope of trajectories described by the crotch 25 of the link plate 2 during rotational motion of the link plate 2. Therefore, when the silent chain 1 wraps around the sprocket S, the crotch 25 of the link plate 2 rotating around the sprocket tooth t slides into the sprocket tooth crest b without colliding with the sprocket tooth t. As a result, at the seating, the occurrence of the pitch noise due to a collision of the link plate 2 with the sprocket tooth t can be prevented and noise can be reduced.

Moreover, in this case, the engagement mode is carried out where the inside flank surface 23 starts to engage with the sprocket and the crotch 25 seats on the sprocket. Therefore, the engagement point of the link plate 2 relative to the sprocket tooth t is transferred from the inside flank surface 23 to the crotch 25 from the onset of engagement till the seating. As a result, an abrupt load variation due to a transfer of the engagement point can be eliminated such as shown in the chain where the inside flank surface starts to engage and then the outside flank surface seats. Thereby, noise can be decreased, load on one sprocket tooth can be lowered, and the life span of the sprocket can be improved.

According to the above-mentioned embodiment, over the entire engagement cycle (i.e. from the onset of engagement till the seating), noise can be further reduced, thereby improving the noise and oscillation properties.

Moreover, in this case, since the connecting surface c is located inside the envelopes l and m, when the engagement point of the link plate 2 on the sprocket tooth t is transferred from the sprocket tooth face a to the sprocket tooth crest b, the engagement point moves from the face a to crest b without contacting the connecting surface c.

In this manner, when the engagement point of the link plate 2 is transferred from the sprocket tooth face a to the sprocket tooth crest b, that is, the silent chain 1 shifts from the linear motion to the rotational motion, the link plate 2 does not come into contact with the sprocket tooth t. Thereby, the maximum surface pressure will not occur at the boundary portion between the sprocket tooth face a and the sprocket tooth crest b. As a result, wear to the silent chain 1 and the sprocket S can be reduced.

In the above-mentioned embodiment, the connecting surface c on the sprocket tooth t that connects the face a with the crest b was a curved surface with the radius of curvature r and inscribed in the envelopes l and m, but the application of the present invention is not limited to such an embodiment.

Figure 6:
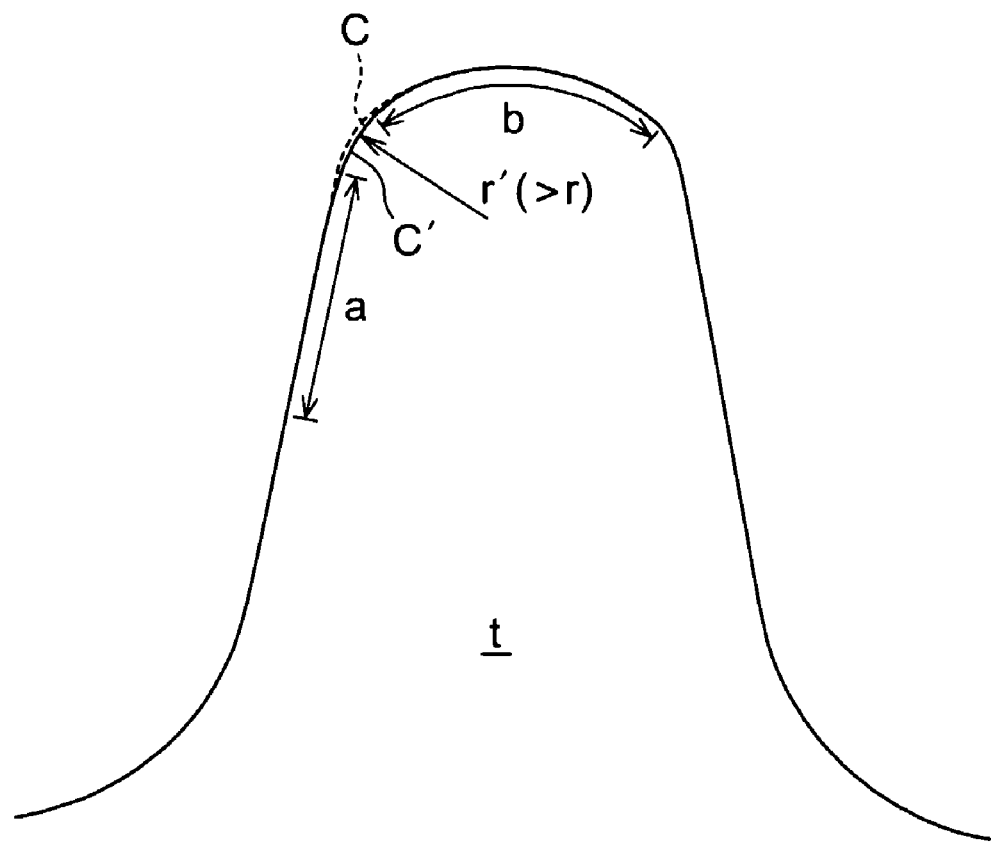
FIG. 6 is a variant of FIG. 5.
Figure 7:
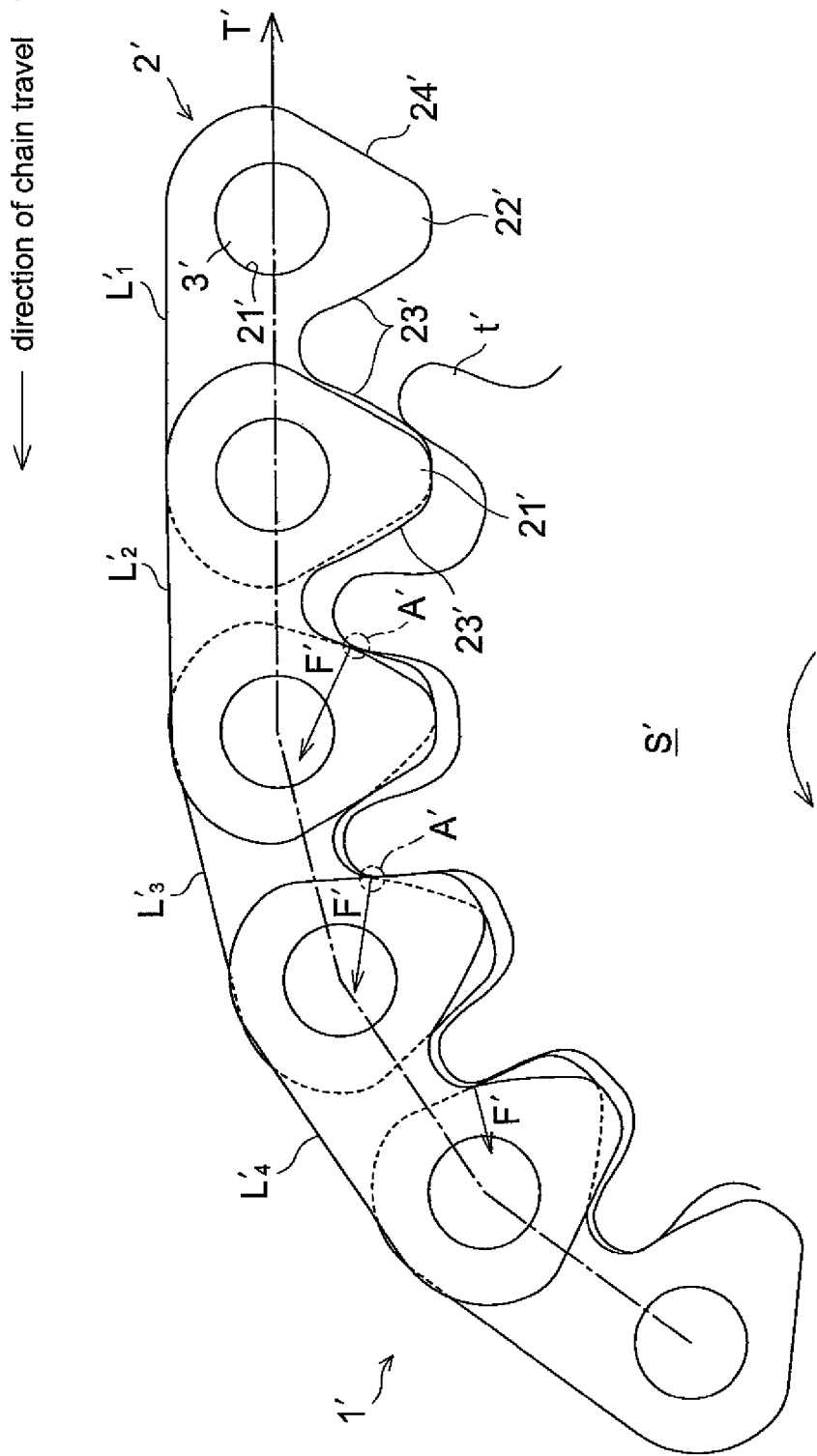
FIG. 7 is a side view of a portion of a silent chain power transmission device of prior art.

In another embodiment shown in FIG. 6, a connecting surface c' on the sprocket tooth t that connects the face a with the crest b is formed by a curved surface with the radius of curvature r' that is greater than the radius of curvature r. Thereby, the connecting surface c' is located inside the connecting surface c.

In this case, when the engagement point of the link plate 2 on the sprocket tooth t travels from the face a to the crest b, the inside flank surface 23 and the crotch 25 of the link plate 2 are hard to contact the connecting surface c'. Therefore, when the silent chain 1 shifts from the linear motion to the rotational motion, the maximum surface pressure will not occur at the boundary portion between the face a and the crest b. As a result, wear to the silent chain S and the sprocket can be securely decreased.

Also, the connecting surface on the sprocket tooth t may be flat. Alternatively, the connecting surface may be a concavely curved surface. In this case, the concavely curved surface formed between the face a and the crest b can hold oil. Thereby, wear to the link plate 2 and the sprocket tooth t can be reduced.

INDUSTRIAL APPLICABILITY

A silent chain power transmission device according to the present invention is useful for the automotive industry. The present invention also has application to a back-drive-type silent chain in which a pair of teeth are provided on opposite sides of the pin aperture centerline of the link plate.

The invention claimed is:

1. A silent chain power transmission device comprising a silent chain and a sprocket used together with the silent chain, the silent chain being formed of a plurality of link plates that are pivotably interconnected to each other via connecting pins, each of the link plates having a pair of teeth each formed of an inside flank surface and an outside flank surface, the inside flank surfaces of adjacent teeth coupled together to form a crotch,
   wherein a face of a sprocket tooth, which contacts the silent chain at the onset of engagement, has a tooth profile that is an envelope of trajectories described by the inner flank surface of the link plate when the silent chain moves linearly toward the sprocket and engages with the sprocket without causing a chordal action;
   wherein a crest of the sprocket tooth, which contacts the silent chain at the time of seating on the sprocket tooth, has a tooth profile that is an envelope of trajectories described by the crotch of the link plate when the link plate rotates around the connecting pin during the wrapping motion of the silent chain around the sprocket; and
   wherein a connecting surface that connects the face of the sprocket tooth with the crest is formed of a curved surface which is inscribed in the envelope of the trajectories during the linear motion of the link plate and the envelope of the trajectories during the rotational motion of the link plate and the connecting surface of the sprocket tooth is not in contact with the link plate of the silent chain at the time of engagement with the silent chain.

2. A silent chain power transmission device comprising a silent chain and a sprocket used together with the silent chain, the silent chain being formed of a plurality of link plates that are pivotably interconnected to each other via connecting pins, each of the link plates having a pair of teeth each formed of an inside flank surface and an outside flank surface, the inside flank surfaces of adjacent teeth coupled together to form a crotch, wherein a face of a sprocket tooth, which contacts the silent chain at the onset of engagement, has a tooth profile that is an envelope of trajectories described by the inner flank surface of the link plate when the silent chain moves linearly toward the sprocket and engages with the sprocket without causing a chordal action;

wherein a crest of the sprocket tooth, which contacts the silent chain at the time of seating on the sprocket tooth, has a tooth profile that is an envelope of trajectories described by the crotch of the link plate when the link plate rotates around the connecting pin during the wrapping motion of the silent chain around the sprocket; and wherein a connecting surface that connects the face of the sprocket tooth with the crest is formed of a first curved surface whose radius of curvature is greater than a radius of curvature of a second curved surface, which is inscribed in the envelope of the trajectories during the linear motion of the link plate and the envelope of the trajectories during the rotational motion of the link plate.

3. The silent chain power transmission device of claim 2, wherein the connecting surface of the sprocket tooth is not in contact with the link plate of the silent chain at the time of engagement with the silent chain.

4. A silent chain power transmission device comprising a silent chain and a sprocket used together with the silent chain, the silent chain being formed of a plurality of link plates that are pivotably interconnected to each other via connecting pins, each of the link plates having a pair of teeth each formed of an inside flank surface and an outside flank surface, the inside flank surfaces of adjacent teeth coupled together to form a crotch, wherein a face of a sprocket tooth, which contacts the silent chain at the onset of engagement, has a tooth profile that is an envelope of trajectories described by the inner flank surface of the link plate when the silent chain moves linearly toward the sprocket and engages with the sprocket without causing a chordal action;

wherein a crest of the sprocket tooth, which contacts the silent chain at the time of seating on the sprocket tooth, has a tooth profile that is an envelope of trajectories described by the crotch of the link plate when the link plate rotates around the connecting pin during the wrapping motion of the silent chain around the sprocket; and wherein a connecting surface that connects the face of the sprocket tooth with the crest is a concavely curved surface.

5. The silent chain power transmission device of claim 4, wherein the connecting surface of the sprocket tooth is not in contact with the link plate of the silent chain at the time of engagement with the silent chain.

\* \* \* \* \*